United States Patent [19]
Ladouceur

[11] 3,923,089
[45] Dec. 2, 1975

[54] NUT AND PANEL ASSEMBLY

[75] Inventor: Harold A. Ladouceur, Livonia, Mich.

[73] Assignee: Multifastener Corporation, Detroit, Mich.

[22] Filed: June 5, 1974

[21] Appl. No.: 476,747

Related U.S. Application Data

[63] Continuation-in-part of Ser. No. 353,049, April 20, 1973, which is a continuation-in-part of Ser. No. 149,517, June 3, 1971, abandoned.

[52] U.S. Cl................. 151/41.73; 29/512; 29/523; 72/254
[51] Int. Cl.²....................................... F16B 39/282
[58] Field of Search........... 151/41.73, 41.72, 41.75, 151/41.71, 37; 29/509, 512, 522, 432, 432.1, 243.52, 523; 10/86 R, 152 R; 285/382.4; 85/32 K, 32 R, 32 V, 41, 47

[56] References Cited
UNITED STATES PATENTS

| | | | |
|---|---|---|---|
| 1,502,399 | 7/1924 | Renner | 151/41.72 |
| 1,600,665 | 9/1926 | Cocks | 85/41 U |
| 2,004,182 | 6/1935 | Arey | 29/522 X |
| 2,061,269 | 11/1936 | Coakley | 29/512 X |
| 2,254,924 | 9/1941 | Williams | 29/512 X |
| 2,379,804 | 7/1945 | Johnson | 151/41.73 X |
| 3,193,857 | 7/1965 | Kahn | 151/41.73 X |
| 3,221,533 | 12/1965 | Buys | 29/512 X |
| 3,234,987 | 2/1966 | Hentzl | 151/41.72 |
| 3,282,317 | 11/1966 | Zahodiakin | 151/41.73 |
| 3,438,299 | 4/1969 | Gutshall | 85/41 |
| 3,510,929 | 5/1970 | Kilmarx | 29/432 X |
| 3,736,969 | 6/1973 | Warn | 151/41.73 |
| 3,824,675 | 7/1974 | Ballantyne | 151/41.73 X |

FOREIGN PATENTS OR APPLICATIONS

| | | | |
|---|---|---|---|
| 918,090 | 9/1954 | Germany | 29/512 |

*Primary Examiner*—Ramon S. Britts
*Attorney, Agent, or Firm*—Cullen, Settle, Sloman & Cantor

[57] ABSTRACT

A nut for installation on a metal panel includes an end mounting face and a centrally located circular bore through said face for threadedly receiving a bolt. The nut further includes a counterbore concentric with the circular bore and axially terminating in an annular surface having a plurality of equally spaced points projecting toward the mounting face. The points define a crown-shaped indent having a valley between each pair of adjacent points for receiving panel material to stabilize the nut during a threading operation against rotational and axial displacement.

The method for installing the nut on the panel includes positioning the nut mounting face against a metal panel and piercing the panel in alignment with the nut bore axis to deflect the panel material circumscribed by the counterbore into said counterbore indent. The deflected material assumes an annular configuration projecting from the panel and terminating in a crown-shaped end portion adjacent and conjugate to the terminal end of the nut counterbore. The interlocking counterbore and panel projection configurations stabilize the nut on the panel and may be utilized in combination with a self-tapping bolt which is threaded into the counterbore to simultaneously thread the inner surface of the nut points and the terminal portion of the projection, before threading into the circular nut bore.

The piercing die for forming the panel projection and installing the nut on the panel includes an elongated piercing tool and a support structure for receiving and orienting the nut. The piercing tool includes a rounded tip having a plurality of flat surfaces or grooves inclined relative to the tool axis. The tip surfaces intersect to form a piercing point and tearing edges, which form the crown-shaped terminal portion of the panel projection.

16 Claims, 15 Drawing Figures

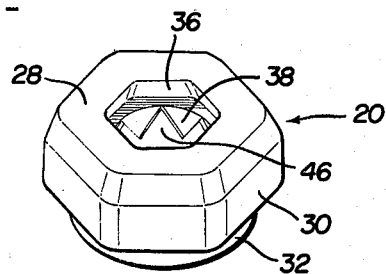
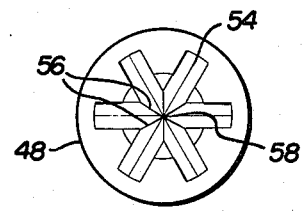
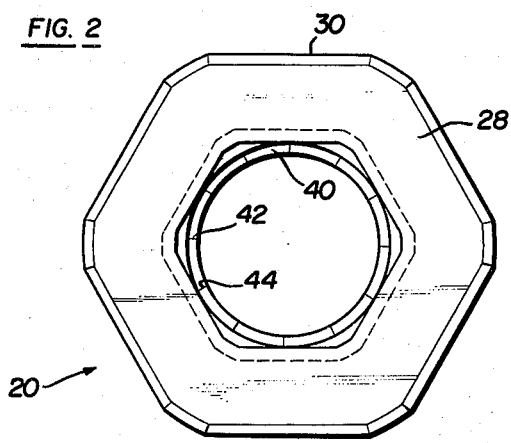
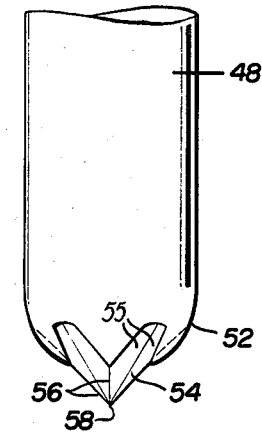
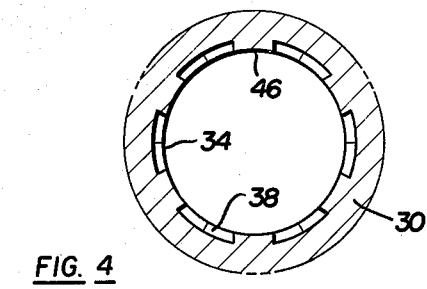

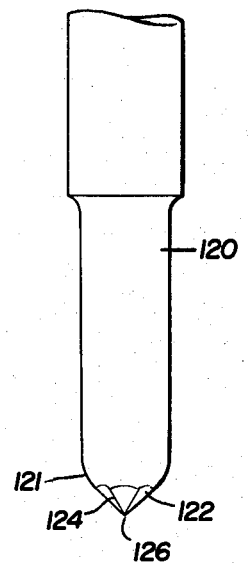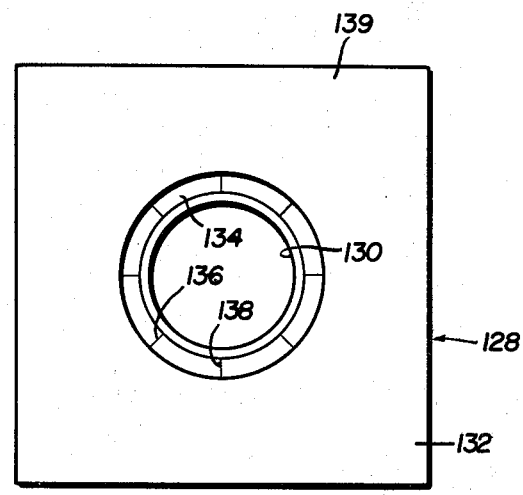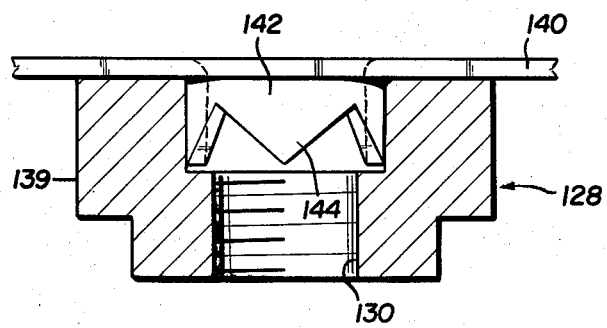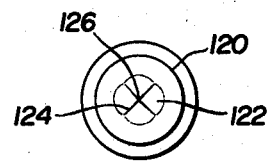

3,923,089

NUT AND PANEL ASSEMBLY

CROSS-REFERENCE TO RELATED APPLICATIONS

This application is a continuation-in-part of my copending application for United States Patent, Ser. No. 353,049, filed Apr. 20, 1973, which is in turn a continuation-in-part of my application for United States Patent, Serial no. 149,517, filed June 3, 1971, now abandoned.

BACKGROUND OF THE INVENTION

1. Field of the Invention

The present invention relates to a nut, a nut and panel assembly, the method of assembling the nut and panel, and the piercing tool for assembling same. More particularly, the invention relates to a nut having a counterbore indent terminating in a crown-shaped configuration for receiving panel material to stabilize the nut against the panel when a bolt is threaded into the nut and panel.

2. The Prior Art

The prior art includes the disclosure of a nut and panel assembly, wherein the nut includes a first circular bore for threadedly receiving a bolt and a counterbore tapering toward the nut face abutting the panel, as disclosed in U.S. Pat. No. 3,282,317 to Zahodiakin. The primary purpose for the tapering counterbore is to stabilize the nut on the metal panel assembly against axial displacement due to the push-off forces encountered when a self-tapping bolt, or the like, is threaded into the nut bore. Such an arrangement, however, does not preclude rotational displacement of the nut during the threading operation, which can cause cross-threading. Further, because the self-tapping bolt threads directly into the nut bore, the nut can be axially displaced from the panel even in view of the tapering counterbore locking arrangement.

Other prior art patents, for example as illustrated by U.S. Pat. No. 3,234,987 to Hentzi, disclose a nut configuration including a plurality of radial serrations for stabilizing the nut on the panel against rotational displacement during the threading operation. The Hentzi patent further includes the provision of a deformed nut edge for stabilizing the nut on the panel against axial displacement. However, the Hentzi patent discloses a nut having a threaded bore for receiving a male bolt member, rather than a circular bore for receiving a self-tapping bolt member, as contemplated in one of the preferred embodiments of the present invention. Should the Hentzi nut be employed in combination with a self-tapping bolt, it is quite probable that the nut would become displaced either axially or rotationally since the axial threading forces would be applied directly to the nut.

The present invention overcomes the prior art problems of nut rotational and axial displacement by the provision of a counterbore terminating in an annular face having a hill-and-valley configuration. Panel material circumscribed by the nut counterbore is pierced and deflected into the shape of an annular projection terminating in an end portion conjugate with and adjacent to the counterbore annular surface. The interlocking crown relationship between the nut counterbore and the deflected panel material stablizies the nut against rotational and axial displacement during a bolt threading operation.

Other prior art patents, for example U.S. Pat. No. 2,004,182 to Arey, disclose piercing a panel and deflecting the panel material to assume a jagged end configuration. However, the Arey patent does not control the breakout of the pierced panel material, in contrast to the present invention which deflects the panel material into a counterbore terminating in an annular surface conjugate the terminal end of the panel breakout to stabilize the nut against rotational displacement during a self-tapping operation.

SUMMARY OF THE INVENTION

The present invention includes a nut having an attachment face for installation on a metal panel and a circular bore through the installation face to accomodate a bolt, which may or may not be of the self-tapping type. To stabilize the nut on the panel against rotational displacement during the bolt threading operation, the nut further includes a counterbore in the attachment face terminating in an annular surface having a crown-shaped configuration. The nut may additionally include a second counterbore tapering toward the attachment face to form a re-entrant groove for receiving panel material to stabilize the nut during the threading operation against axial displacement.

The method of installing the nut on a metal panel includes orienting the nut attachment face against the panel and piercing the panel in alignment with the nut bore with a piercing tool. The piercing tool includes an end having a plurality of intersecting flat surfaces thereon which are inclined relative to the nut bore axis and intersect to define a plurality of edges and a piercing point. The intersecting flat surfaces are defined by a plurality of "flats" in one embodiment and by a plurality of grooves in another embodiment. The piercing and installation procedure includes ramming the piercing tool through the panel material and into the nut bore to axially displace and extrude the panel material circumscribed by the nut counterbore into the nut. The deflected panel material assumes an annular configuration terminating in a plurality of pointed edges which are formed by the piercing tool edges. During the installation procedure the nut is oriented such that the counterbore crown-shaped annular configuration is aligned with the piercing tool so that the panel projection end is extruded into the counterbore indent to interlock the nut on the panel against rotational and axial push-off forces encountered during a bolt threading operation. In the preferred embodiment the nut includes a re-entrant groove defining a tapering recess. A portion of the panel material is extruded or ironed into the tapering recess by the punching action of the piercing tool and serves to further stabilize the nut on the panel against axial push-off forces.

The annular panel projection formed during the piercing operation is extruded into the nut counterbores, as previously described, and may have an inner diameter substantially the same as the diameter of the nut bore so that a continuous female thread may be formed through the panel projection and into the nut bore. When a self-tapping bolt is employed, as the bolt is threaded into the nut and panel assembly, it first threads into the panel projection material, which thereby absorbs axial threading forces exerted on the assembly by the bolt. As the bolt continues to thread into the assembly, it simultaneously threads through the pointed portions on the terminal end of the panel projection and into the inner side surfaces of the points defined by the counterbore indent configuration. The simultaneous threading operation into these two interlocking surfaces yields two highly desireable results. First, the nut is stabilized against rotational forces encountered during the threading operation; and second, the points defined by the nut counterbore provide a "lead-in" to assure a continuous thread from the panel material into the nut bore.

Naturally, these same advantages result from the interlocking crown-shaped panel projection and counterbore indent, regardless of the type bolt employed since these structural features stabilize the nut on the panel during a threading procedure, whether it be by a self-tapping bolt or otherwise.

During the bolt threading operation the panel projection material is expanded outwardly into tight peripheral engagement with the nut counterbore surfaces. Continued threading then draws the nut and panel tightly together, forming a secure panel assembly.

Accordingly, the prior art problems of stabilizing a nut on a metal panel during a threading operation is solved by the present invention through a single-stroke punch operation by controlling the breakout of the panel material during the piercing and installation procedure.

BRIEF DESCRIPTION OF THE DRAWINGS

FIG. 1 is a perspective illustration of the nut forming the present invention.

FIG. 2 is a top plan view of the nut, illustrating the counterbore configuration which stabilizes the nut against a metal panel.

FIG. 3 is a vertical sectional view of the nut.

FIG. 4 is a sectional view along line 4—4 of FIG. 3.

FIG. 5 is an end view of the piercing tool, illustrating the tearing edges and flat surfaces which control the breakout of the pierced panel portion.

FIG. 6 is a partial sectional view illustrating the nut and panel within the piercing die for assembly.

FIGS. 12 and 13 are side elevational and plan views, respectively, of a piercing tool for forming a panel projection to mate with the nut illustrated in FIGS. 14 and 15.

FIG. 14 is a top plan view of a second embodiment for the nut encompassing present invention, wherein the nut is four-sided.

FIG. 15 is a partial sectional view illustrating a completed panel and nut assembly utilizing the nut illustrated in FIG. 14.

DETAILED DESCRIPTION OF THE INVENTION

Figure 7:
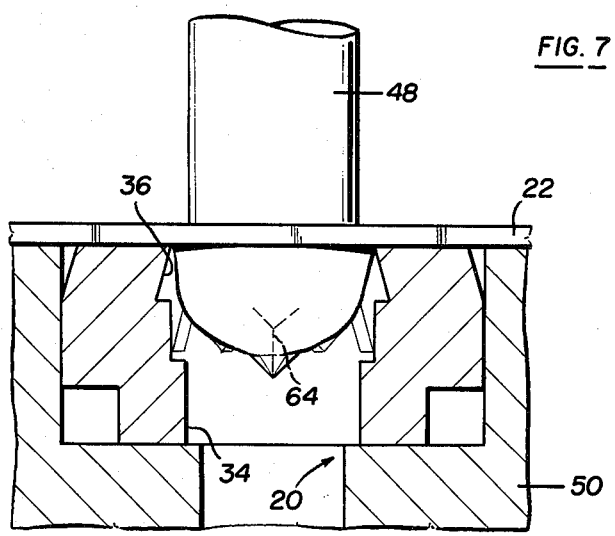
FIGS. 7 and 8 are partial sectional views similar to FIG. 6, but illustrating the deflection of the panel material into the nut during installation.
Figure 8:
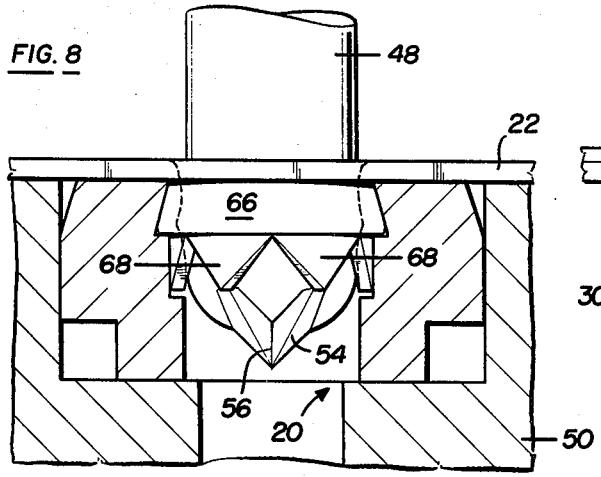
Figure 11:
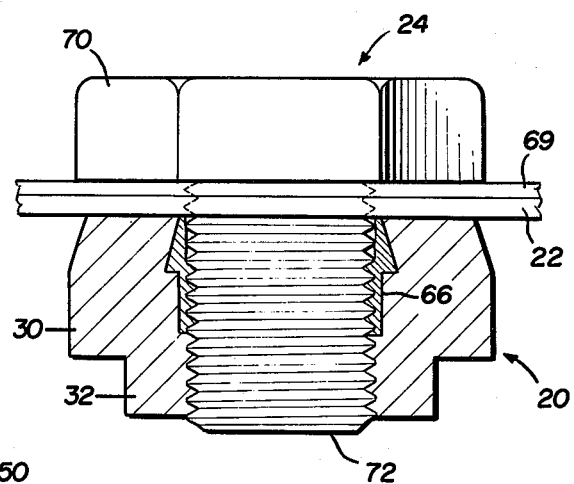
FIG. 11 is a partial sectional view illustrating the completed nut, panel, and bolt assembly, wherein the self-tapping bolt forms a continuous thread through the panel projection and into the nut bore.
Figure 9:
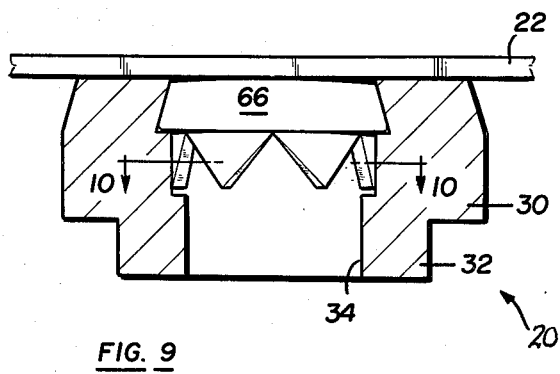
FIG. 9 is a partial sectional view illustrating the completed nut and panel assembly.

The present invention relates to a nut 20 (illustrated in perspective in FIG. 1), the nut in combination with a panel 22 (as illustrated in FIG. 9), the nut and panel assembly in combination with a self-tapping bolt 24 (as illustrated in FIG. 11), and a piercing die 26 for installing the nut on the panel (as illustrated in FIGS. 6–8).

As illustrated in FIGS. 1–3, the nut 20 includes an end mounting face 28, a hexagonal pilot portion 30 and a cylindrical base portion 32, through which a circular bore 34 extends to receive the self-threading bolt 24. The outer configuration of the nut does not, per se, form a part of the present invention but is generally chosen on the basis of the particular application for the nut. However, as will be discussed in greater detail below, the outer configuration of the pilot portion may be employed for orienting the nut within the piercing die.

The nut 20 further includes a re-entrant groove 36, which tapers toward the end mounting face 28 to receive panel material for stabilizing the nut on the panel against axial and rotational displacement. The re-entrant groove 36 is formed from a first nut counterbore in accordance with the teachings of my U.S. Pat. No. 3,793,658, incorporated by reference. The inclusion of the re-entrant groove for stabilizing the nut on the panel is not critical to the present invention, as will become apparent from the discussion relating to the second embodiment of the nut illustrated in FIGS. 14 and 15. However, the incorporation of this groove within the present nut complements the overall structural arrangement of the nut and panel interlocking features proposed by the present invention.

A second counterbore or chamber 38 is included within the nut 20 and terminates in an annular surface 40 having a plurality of "peaks and valleys" 42 and 44, respectively. Expressed another way, the peaks of the annular surface constitute points extending toward the nut end mounting face 28 to define a crown-shaped counterbore indent which receives panel material to stabilize the nut on the panel against rotational displacement when the bolt 24 is threaded into the assembly. This annular "hill-and-valley" or crown-shaped configuration of counterbore 38 is formed by a tubular "header die" (not shown) having an end configuration conjugate the peaks and valleys 42 and 44.

As best illustrated in FIG. 4, inner surfaces 46 of the peaks are cylindrical and axially aligned with the nut bore surface to form pointed extensions of the bore 34 to accomodate the bolt 24, as discussed in greater detail below. FIG. 4 also vividly illustrates the alternating hill and valley arrangement which serves as an interlock with the panel assembly after the panel has been pierced and the material circumscribed by the nut counterbores has been axially deflected into the nut during the piercing operation.

To assemble the nut and panel combination the component parts, i.e. the nut 20 and the panel 22, are positioned within a piercing die 26, comprising a piercing tool 48 and a die support 50. The piercing tool includes an elongated, prong-shaped member terminating in a rounded tip 52 having a plurality of inclined grooves 54, formed by grinding, for example. Each groove 54 includes a pair of inclined flat surfaces 55. These flat surfaces intersect to define tearing edges 56 and a piercing point 58, which control the breakout of the panel material deflected into the nut so that the terminal portion of the panel projection formed during the piercing and installing operation assumes a shape conjugate with and adjacent to the annular surface configuration 40 in the nut. The distal ends of the grooves 54 project away from the tearing edges and are circumferentially spaced.

It has been found necessary to provide grooves, as opposed to "flats" as shown in FIG. 12, on any embodiment of the piercing tool which is to be used for forming a crown-shaped panel projection having six or more points. A piercing tool having six or more "flats" does not properly form the desired break-out configuration for the panel projection, whereas the provision of grooves accomplishes the desired effect. It is believed that the grooves provide sharper tearing edges 56 which can properly form the crown-shaped terminal portion of the panel projection for greater numbers of peaks or points.

The support die 50 includes a supporting surface 60 on which the nut 20 is positioned and a plurality of vertical surfaces for orienting the nut in proper relation to the tearing edges of the piercing tool 48. In order to properly position the nut in alignment with the piercing tool the number of surfaces 62 should correspond to the number of outer peripheral surfaces on the nut pilot 30. Accordingly, the die support 50 illustrated in FIG. 6 will have six vertical orienting surfaces 62 for properly positioning and accomodating the hexagonal pilot configuration of nut 20.

Prior to the piercing and installation procedure, the nut 20 is conveyed through a tumbler, well-known to those skilled in the art, where it is oriented with end mounting face 28 upwardly for position within the die support 50. In order to properly position the nut within the die support so that the counterbore annular configuration properly mates with the piercing tool tip structure, the number of side orienting faces 62 should be an integer of the number of annular points or valleys in the nut. For example, the nut illustrated in FIG. 2 includes six annular points, six annular valleys, and six sides. As previously discussed die support 50 also includes a hexagonal configuration similar to the outer configuration of the nut pilot portion 30. By this relationship the annular surface of the counterbore is properly positioned in relationship to the piercing tool end structure so that the breakout of the panel material properly mates and seats into the crown-shaped indent of the counterbore. This relationship between the piercing tool end structure and the nut annular counterbore configuration will hold true regardless of the rotational orientation position of nut 20 within the support die structure 50. Further it can be appreciated that a similar orientation within the piercing die will be occassioned when the number of points and valleys within the counterbore indent is a multiple of the number of nut pilot surfaces and die support orienting faces. It naturally follows, then, that the number of grooves or flats on the piercing tool top can also be a multiple of the number of die support orienting faces.

As illustrated in FIGS. 7 and 8, the piercing and installation procedure is effected by driving the piercing tool 48 through the panel material 22 in alignment with the axis of nut bore 34. The actual piercing or punching reciprocation of the piercing tool 48 results in an extrusion of the panel material circumscribed by the nut counterbore 38. Additionally, the panel material adjacent the edge of the counterborre forming the re-entrant groove is extruded or "ironed" into the tapering recess of the re-entrant groove for retaining the nut on the panel against axial displacement forces. As illustrated in FIG. 7, the piercing tool 48 has advanced into the counterbores of the nut to begin the extrusion process of the panel material. Reference numeral 64 indicates the panel material adjacent the tearing edges 56 of the piercing tool as it begins to tear to form a pointed end configuration which is extruded into the crown-shaped counterbore indent. As the piercing tool 48 is advanced into the nut bore, as shown in FIG. 8, the displaced panel material assumes an annular configuration 66 terminating in a crown-shaped end portion having a configuration conjugate the annular end surface of counterbore 38 and including a plurality of triangular-shaped projections 68. Due to the extrusion of the material, the projection thickness will be less than the panel thickness. The triangular-shaped end portions 68 are formed as projections between the tears in the extruded panel projection and are aligned with the flat surfaces on the tip of the piercing tool. The end portion of the panel projection 66 is slightly spaced from the annular counterbore configuration to allow the material to be extruded further when the bolt 24 is threaded. The space between the end of the panel projection and the annular counterbore surface is exaggerated in FIG. 8 for purposes of illustration.

The dotted lines in FIG. 8 illustrate the inner diameter of the panel projection and show that the inner diameter is greater in the region adjacent the re-entrant groove 36 due to the material having been ironed into said re-entrant groove.

Figure 10:
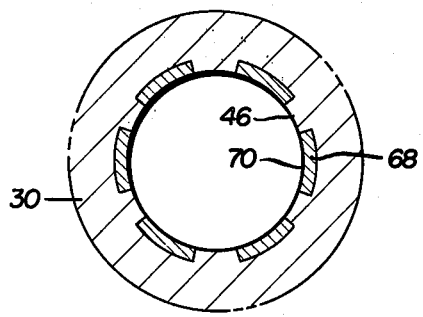
FIG. 10 is a sectional view along line 10—10 of FIG. 9, illustrating the interlocking relationship between the nut counterbore configuration and the terminal portion of the panel projection.

As illustrated in FIG. 10, the inner surfaces 70 of the projections 68 are cylindrical to define with the inner surfaces 46 an essentially smooth circular surface continuous with the bore surface 34. FIG. 10 also illustrates the interlocking characteristics of the panel projections 68 and the peaks 42 defined by the crown-shaped counterbore indent.

It can be seen from FIGS. 8 and 9 that all of the panel material deflected from the region circumscribed by the nut counterbores is utilized in the formation of the panel projection 66 and triangular tip portions 68. As a result, the piercing and installation procedure encompassed by the present invention eliminates the production of a metal slug which would otherwise litter the shop floor. FIG. 9 also illustrates that the inner diameters of the counterbore points and the panel points are substantially the same as the diameter of the bore 34, to enable a continuous thread.

FIG. 11 illustrates the nut and panel assembly in its designed application wherein a secondary panel 69 is secured to the metal panel 22 by the bolt 24, which consists of a bolt head 70 and a self-tapping shank 72 having a continuous male thread. To form the combination nut, bolt, and panel assembly, the bolt 24 is threaded into the terminal portion of the panel projection which has a reduced inner diameter, thereby expanding that portion of the panel material outwardly into tight peripheral engagement with the nut counterbore surfaces. Because the bol first threads into the panel material the axial forces encountered during the threading operation are absorbed by the panel projection rather than by the nut itself. Accordingly, the nut 20 is stabilized on the panel assembly against axial displacement. Even when the end portion of the bolt 24 threads through the panel projection and into the nut bore 34, the major portion of such axial threading forces are still absorbed by the panel projection due to the portion of the threaded bolt shank in engagement with the previously formed threads. Any forces which are not absorbed by the threaded panel projection are counter-balanced by the interlocking feature of the panel material being radially displaced into the re-entrant groove 36.

As the bolt continues to thread axially through the panel projection, it threads into the arcuate wall surfaces 46 of the points 42 defined by the crown-shaped counterbore indent. In actuality the points or peaks 42 are extensions of the bore wall surface 34 and thereby enable a gradual threading lead-in to the nut portion of the nut and panel assembly. Even further, the axial push-off forces normally encountered when the self-tapping bolt threads into the nut bore are eliminated since the nut is still in engagement with the crown-shaped end portion 68 of the panel projection.

It can also be seen from FIG. 11 that the space illustrated in FIG. 8 between the end portion of the panel projection and the annular surface 40 has been filled with panel material which was extruded downwardly during the threading operation. FIG. 11 further illustrates the region where bolt shank 72 first starts threading into the panel projection. After the bolt has been threaded into the nut and panel assembly, continued threading then draws the nut and panel tightly together, forming a secure panel assembly.

A second embodiment of the present invention is illustrated in FIGS. 12–15. FIGS. 12 and 13 illustrate a piercing tool 120 having a rounded tip 121 similar to the rounded tip 52 on the piercing tool 48. The tip 121 includes four flat surfaces or "flats" inclined relative to the longitudinal axis of the piercing tool and intersecting to define a plurality of tearing edges 124 and a piercing point 126. As discussed previously, it has been found that grooves are necessary for forming six or more points on the crown-shaped panel projection. However, when four or less points are desired, flats can be utilized. It is believed that the tearing edges defined by the flats for lower number of panel projection points are sufficiently sharp for defining the desired breakout.

The nut for utilization in combination with piercing tool 120 is illustrated in FIG. 14 as including a four-sided nut 128. The nut includes a threaded circular bore 130 perpendicular to a mounting face 132 and a counterbore having an annular surface 134. In a manner similar to the embodiment of FIGS. 1–3, the annular surface 134 includes a plurality of peaks and valleys, 136 and 138 respectively. The particular embodiment illustrated includes four such peaks 136 to correspond to the number of pilot peripheral surfaces to accomodate the orientation of the peaks and valleys within the piercing die in relationship to the tearing edges and flats 124 and 122, respectively, on the piercing tool 120. As previously mentioned the re-entrant groove illustrated in the embodiment of FIGS. 1–3 is not critical to the present invention and, in fact, is not included within the nut embodiment of FIG. 14. This embodiment also contemplates a nut, panel and bolt assembly wherein the bolt is not of the self-tapping type. Accordingly, the threaded surface 130 is not longitudinally aligned with the inner wall surfaces of the interlocking crown-shapes of the counterbore and panel projection, as illustrated, so that the bolt may be threaded directly into the nut bore.

As illustrated in FIG. 15, the nut 128 is assembled on a panel 140 by the interlocking arrangement of the nut counterbore and the panel projection 142, which is formed in a die piercing operation by tool 120. Just as in the first embodiment, the panel projection 142 terminates in a plurality of triangular points 144 conjugate the shape of the annular counterbore surface 134 to interlock nut and panel to resist rotational displacement.

The method of assembling the nut and panel assembly disclosed in the two embodiments of the present application, then, includes orienting the nut mounting face against a metal panel in a piercing die so that the peaks of the nut counterbore annular surface align with the tearing edges of the piercing tool. Next, the piercing tool is driven axially into the panel material circumscribed by the nut counterbore and deflects that material axially of the nut bore. During the piercing step, the panel material is axially extruded into the nut to form an annular projection and the central portion of the deflected material is torn by the piercing tool edges to form the terminal portion of the annular projection which is conjugate and adjacent to the crown-shaped nut counterbore indent. In a nut embodiment including the re-entrant groove for stabilizing the nut on the panel against axial displacement, the operation of the piercing tool extrudes or "irons" a portion of the deflected panel material into the tapering re-entrant groove.

To complete the nut, bolt, and panel assembly, a bolt is threaded into the nut and panel combination. In the embodiment utilizing a self-tapping bolt, the bolt first threads into the annular panel projection formed during the piercing operation so that the axial threading forces are absorbed by the panel rather than by the nut. Subsequently the bolt simultaneously threads into the annular surfaces of the peaks defined by the crown-shaped counterbore indent and into the terminal portion of the panel projection. As a result of the interlocking relationship between the panel projection and the nut counterbore configuration, the nut is stabilized on the panel against rotational displacement and the bolt properly threads into the nut bore surface.

It is to be understood that the previously described embodiments are merely exemplary of the present invention and not intended to be limiting in any sense.

Having fully and completely described my invention, I now claim:

1. A nut for installation on a metal panel, said nut having a longitudinal axis, one axial extremity of said nut defining an end face abuttable against the panel and being generally perpendicular to said longitudinal axis, said nut having an axial circular bore projecting through said end face concentric with said axis for accomodating a self-tapping bolt, the improvement of a counterbore concentric with said axis and adjacent said end face, said counterbore including a crown-shaped indent concentric with said axis for receiving panel material, said indent defining a plurality of generally equally circumferentially spaced pointed extensions projecting toward said end face, said extensions being triangular-shaped in the axial direction and having an inner cylindrical surface concentric with said axis and forming an axial extension of the nut bore having the same internal diameter surface to accomodate the self-threading bolt, wherein a bolt simultaneously threads into panel material within the indent and into the pointed extensions prior to threading into said circular bore for stabilizing said nut on the panel against rotary displacement.

2. The nut as defined in claim 1, further including a pilot adjacent said end face, said pilot having a plurality of flat peripheral surfaces generally parallel to the longitudinal axis of said bore, the number of pointed extensions defined by said indent being a multiple of the number of peripheral pilot surfaces.

3. The nut as defined in claim 2, further including the improvement of an additional counterbore adjacent said end face, said additional counterbore tapering toward said end face and defining a chamber for receiving panel material to secure the nut on the panel against axial displacement.

4. A combination nut and panel assembly, said nut having a longitudinal axis, one axial extremity of said nut defining an end face engaging the panel and being generally perpendicular to said longitudinal axis, said nut having an axial circular bore projecting through said end face concentric with said axis for accomodating a self-tapping bolt, the improvement of a counterbore in said nut concentric with said axis and adjacent said end face, said counterbore terminating away from said end face in a plurality of equally circumferentially spaced indentations being generally triangular in the axial direction, said indentations defining a plurality of pointed extensions projecting toward said end face, said extensions having an inner cylindrical surface concentric with said axis and forming a longitudinal extension of the circular nut bore surface having a substantially the same internal diameter to accomodate the self-tapping bolt, the panel portion circumscribed by said bore being apertured and the panel material from said aperture being axially displaced of the nut into said counterbore to define a generally annular projection extending from said panel, said projecting terminating a plurality of triangular points conjugate with the triangular counterbore indentations, said triangular points having an inner diameter substantially the same as the diameter of the circular bore, wherein a bolt simultaneously threads into the triangular points of said displaced panel material within the triangular counterbore indentations and into the plurality of pointed extensions defined by said indentations prior to threading into said circular bore for stabilizing said nut on the panel against rotational and axial displacement.

5. The assembly as defined in claim 4, further including the improvement of an additional counterbore adjacent said end face, said additional counterbore tapering toward said end face and defining a chamber receiving displaced panel material to secure the nut on the panel against axial displacement.

6. A nut and panel assembly, in combination, comprising an integral metal nut having a longitudinal axis, one axial extremity of said nut defining an end face in contact with one face of the panel, said nut having a chamber concentric with said axis and opening through said end face, said chamber including at the distal end spaced from said nut and face defining an annular surface, said annular surface having a radial width at least equal to the thickness of said panel and having a plurality of generally equally circumferentially spaced and axially directed triangular-like points extending toward said end face to define an annular crown-shaped indent, a circular bore through said chamber distal end concentric with said longitudinal axis, an annular panel portion displaced axially within said nut chamber and radially outwardly against the longitudinal chamber surfaces, said annular panel portion terminating in a crown-shaped end portion having generally equally spaced points conjugate and mating in interdigitated relation with the circumferentially spaced points of said chamber annular surface providing a mechanical interlock between said panel and said nut securing the nut on the panel against rotational displacement.

7. In a nut, bolt, and panel assembly comprising a nut having an end face abutting the panel and an axial circular bore through said end face generally perpendicular to the panel, a counterbore in said nut end face concentric with said axial bore and axially terminating in a crown-shaped indentation defining a plurality of circumferentially spaced points extending toward the end face, said points being generally triangular-shaped in the axial direction, at least a portion of the panel circumscribed by said counterbore being displaced axially of the nut into said counterbore and radially outwardly into contact with the longitudinal surfaces of said counterbore to define a generally annular panel projection, said panel projection extending into said counterbore indentation and terminating in a crown-shaped end portion conjugate to the configuration of said indentation, the points defined by the indentation having radially inward surfaces being cylindrical and concentric with the nut axis to define extensions of the circular bore surface, and the crown-shaped end portion of said panel projection having an inner diameter substantially the same as the diameter of the circular bore, and said bolt being of the self-tapping type in threaded engagement with the inner surface of the terminal crown-shaped projection, the radially inward surfaces of said points, and the nut bore.

8. The assembly as defined in claim 7, characterized by said bolt forming a continuous female thread in the terminal end of said panel projection, said plurality of points and said nut bore, wherein the crown-shaped projection interlocks with said points to stabilize said nut on the panel against rotational displacement during threading.

9. The assembly as defined in claim 7, including an additional counterbore adjacent said end face, said additional counterbore tapering toward said end face and defining a chamber receiving displaced panel material for securing the nut on the panel against axial displacement.

10. A nut, bolt, and panel assembly, in combination, comprising an integral metal nut having a longitudinal axis, one axial extremity of said nut defining an end face in contact with one face of the panel, said nut having a chamber concentric with said axis and opening through said end face, said chamber terminating at the distal end from said nut end face in an annular surface, said annular surface having a plurality of circumferentially spaced points extending toward said end face to define a crown-shaped indent, said points being triangular in the axially direction, a circular bore through said chamber distal end concentric with said longitudinal axis, the inner diameter of the chamber defined by the interior surface of said points being substantially equal to the diameter of said bore, an annular panel portion displaced axially within said nut chamber and radially outwardly against the longitudinal chamber surfaces, said annular panel portion terminating in a crown-shaped end portion adjacent to and conjugate with said chamber annular surface to secure the nut on the panel against rotational displacement, and a self-threading male threaded member threadably received by said panel portion, the interior surfaces of said points and said circular bore to define a continuous female thread.

11. The assembly as defined in claim 10, characterized by said chamber including a re-entrant groove adjacent said nut end face, said re-entrant groove tapering toward said end face for securing said nut on the panel against axial displacement during the threading of said bolt.

12. In a nut and panel assembly, comprising a metal nut having an end face in contact with one face of a metal panel, said nut having an axial circular bore extending through said end face and being generally perpendicular thereto, said nut further having a counterbore opening through said end face, including an annular crown-shaped indent concentric with said axial bore having a radial width at least equal to the thickness of said panel, said indent defining an annular embossment in said counterbore having a plurality of generally equally circumferentially spaced, axially directed points extending toward said end face and a valley between each two said points, said points being generally triangular-shaped in the axial direction, said panel having a tubular portion projecting into said nut counterbore and contacting the inner counterbore wall and the end of said panel tubular portion having generally equally circumferentially spaced generally triangular indentions and projections conjugate to said crown-shaped annular wall and interdigitated therewith in interlocking mechanical relation with said confronting annular corwn-shaped nut wall preventing relative rotational movement.

13. The nut and panel assembly as defined in claim 12, characterized by the radial inward surface of said annular embossment being cylindrical and concentric with the nut axis to define extensions of the surface defined by said circular bore, and the crown-shaped end portion of said projection having an inner diameter substantially the same as the diameter of the circular bore.

14. The assembly as defined in claim 12, characterized by said nut including an additional counterbore adjacent said end face and tapering toward said end face to define a re-entrant groove, displaced panel material extending into said groove to secure the nut on the panel against axial displacement.

15. The nut and panel assembly defined in claim 13, characterized by said nut including a pilot portion adjacent said end surface, said pilot portion having a plurality of flat peripheral surfaces generally parallel to said circular bore axis, the number of embossment points defined by said crown-shaped indent being a multiple of the number of flat pilot surfaces to accomodate the orientation of said nut relative to the panel.

16. The assembly defined in claim 13, further including a self-tapping bolt threaded into the crown-shaped end portion of the panel projection, the cylindrical surface of said embossment and said circular bore, said bolt being threadably received simultaneously by said displaced material in the valleys and said embossment prior to being threaded into said circular bore for stabilizing said nut on the panel against rotary displacement.

* * * * *